United States Patent [19]
Kimura et al.

[11] Patent Number: 6,000,680
[45] Date of Patent: *Dec. 14, 1999

[54] FLUID OPERATED MACHINE FOR PRYING AND OTHER PURPOSES

[75] Inventors: Kiyoshi Kimura, Fujisawa; Kou Morita, Ayase, both of Japan

[73] Assignee: Kabushiki Kaisha Ogura, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/917,192

[22] Filed: Aug. 25, 1997

[30]  Foreign Application Priority Data

Aug. 26, 1996 [JP] Japan ................................ 8-223896
Feb. 14, 1997 [JP] Japan ................................ 9-030646

[51] Int. Cl.⁶ ...................................................... B66F 3/24
[52] U.S. Cl. .......................... 254/93 R; 30/228; 30/366
[58] Field of Search ................................. 254/93 R, 18, 254/93 H, 93 HP, 124, 104; 72/392, 705; 29/252, 239; 81/302, 349, 383.5, 57.44; 30/228, 180, 199, 366; 173/216, 218

[56]  References Cited

U.S. PATENT DOCUMENTS

| | | | |
|---|---|---|---|
| 3,081,066 | 3/1963 | Murawski | 254/93 R |
| 3,834,434 | 9/1974 | Walsh | 254/93 R |
| 4,273,311 | 6/1981 | Rio | 254/93 R |
| 4,279,141 | 7/1981 | Gallart | 254/93 R |
| 4,973,028 | 11/1990 | Linster | 254/93 R |
| 5,002,135 | 3/1991 | Pellenc | 30/180 |
| 5,134,776 | 8/1992 | Moody | 30/180 |
| 5,622,353 | 4/1997 | Painter et al. | 254/93 R |

*Primary Examiner*—Robert C. Watson
*Attorney, Agent, or Firm*—Dickstein Sharpiro Morin & Oshinsky LLP

[57]  ABSTRACT

A portable, hydraulic prying machine is disclosed for use, for example, in prying open the doors of apartment buildings or of motor vehicles by rescue members in the event of an emergency. A motor and pump assembly, comprising an electric motor and a hydraulic pump driven thereby, is coupled to a pry assembly solely through the medium of a flexible conduit for delivery of a fluid under pressure from the pump to a hydraulic cylinder included in the pry assembly. The hydraulic cylinder on extension causes a pair of prying jaws to spread apart for forcing open the door. Being practically separate from the rest of the machine, the pry assembly is easier of handling. Additional embodiments are disclosed in which the pry assembly is replaced by other tool assemblies for other operations.

8 Claims, 7 Drawing Sheets

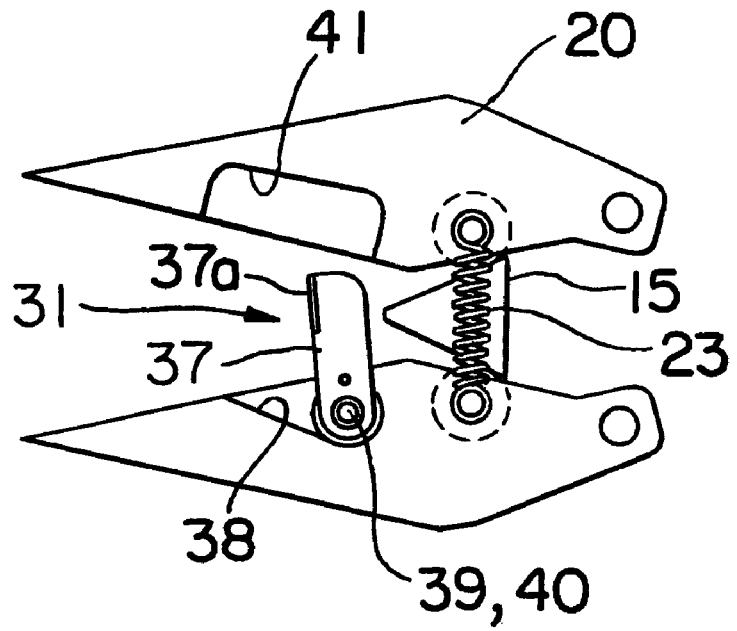
F I G. 7
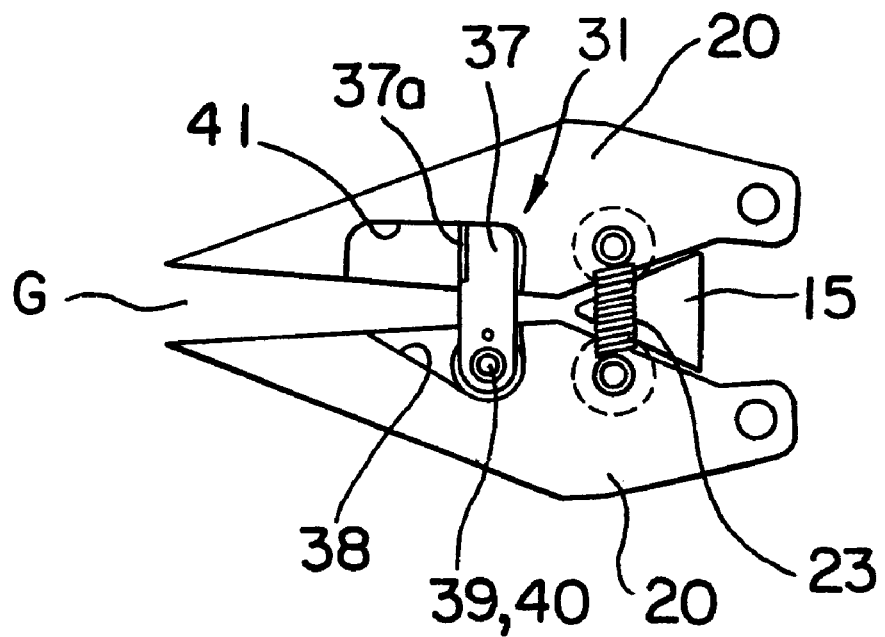
F I G. 8

FLUID OPERATED MACHINE FOR PRYING AND OTHER PURPOSES

BACKGROUND OF THE INVENTION

This invention relates to fluid operated machines, and more specifically to multiple purpose hydraulic machines that lend themselves to use with a variety of tools for a variety of operations such as prying, perforating, and cutting. Still more specifically, the invention concerns a portable, hydraulic machine particularly well adapted for prying open the locked doors of apartment buildings or of motor vehicles in the event of earthquakes, traffic accidents, and other emergencies in order to rescue the confined people, among other purposes.

The portable, hydraulic machine has been known which integrally comprises an electric motor, a pump driven by the motor, and a tool powered by the pump for bending steel frame members, as described and claimed in Japanese Patent Publication No. 6-75738. Machines of like construction have also been suggested which have, instead of the bending tool, tools for perforating, cutting, and so forth.

One of the objections to such prior art machines is that their motors, pumps and tools are inseparably joined together. Two different machines have therefore had to be prepared, for example, first for cutting work and then for perforating the severed pieces.

Another objection manifests itself when the prior art machine is fitted with a pry as a tool, for use, for example, by a rescue team in prying open a steel door of an apartment building or of a motor vehicle in the event of an emergency. The need often arises in such cases for using the prying machine in narrowly confined spaces, not accessible to the complete machine but only to the prying tool if it were separate from the rest of the machine. It is, indeed, only the pry assembly that must be actually held against the door for forcing it open. The rest of the machine, the pump and the drive motor therefor, can be held at a convenient distance away if the pump is in constant communication by some means or other with the pry assembly to deliver a fluid under pressure thereto.

SUMMARY OF THE INVENTION

The present invention has it as an object to provide a fluid operated, multiple purpose machine in which a replaceable tool assembly is coupled to the rest of the machine by means needed only for fluid communication therebetween, such that the tool assembly is capable of use in locations that deny access to the rest of the machine.

Another object of the invention is to provide a machine of the above described general character, so made that the tool assembly is capable of swiveling relative to another part of the machine for greater ease of handling.

Still another object of the invention is to provide a machine of the above described general character which is of particular advantage when used as a power pry for forcing open the doors of buildings and vehicles in the event of emergencies.

Yet another object of the invention is to minimize the power loss in spreading apart the pair of prying jaws.

A further object of the invention is to design the pair of prying jaws so that they may be readily inserted in a narrow gap, for example, between a door and a doorway frame and positively engage them in prying open the door.

A still further object of the invention is to preclude the danger of the operator having his fingers caught between the pair of prying jaws in use of the machine as a power pry.

Briefly, the present invention may be summarized as a fluid operated machine capable of use with a variety of tool means for a variety of operations. The machine broadly comprises drive means, pump means coupled to the drive means thereby to be driven for pressurizing a fluid, and tool means actuated by the pressurized fluid from the pump means for performing a desired operation. The invention particularly features a flexible conduit solely by means of which the tool means is coupled to the pump means.

So constructed according to the invention, the machine is readily adaptable for a variety of operations by providing a variety of interchangeable tool means. Any one of such tool means, coupled to one end of the flexible conduit, may be put to use in any desired locations not accessible to the drive means and the pump means. The drive and the pump means may be positioned at a convenient distance away from the tool means, the flexible conduit of any desired length being the sole means of connection therebetween.

Another feature of the invention resides in a swivel joint through which the drive means and the pump means are coupled together. Therefore, in use of the machine, particularly as a power pry, the prying tool may be readily turned through any required angle (e.g. 90 degrees) with the pump means relative to the drive means.

The machine according to the present invention is particularly well suited for use as a power pry. The invention therefore suggests a pry assembly of novel construction as the tool means. Typically, the pry assembly comprises a fluid actuated cylinder having a piston rod carrying a wedge, and a pair of prying jaws which are spread apart from each other by the wedge upon delivery of the pressurized fluid from the pump means to the fluid actuated cylinder through the flexible conduit. Acting by leverage, the pry assembly can pry open even the steel doors of buildings and vehicles, making the machine best suited for use by professional rescue teams.

Preferably, the pry assembly may additionally comprise a pair of rolls rotatably mounted one to each prying jaw for rolling engagement with the wedge. The fluid pressure that has been delivered to the pry assembly from the pump means will then be utilized almost wholly for spreading apart the prying jaws.

It is also preferred that the pair of prying jaws should each be wedge shaped, with a pair of knurled surfaces facing away from each other. The wedge shaped prying jaws are best suited for insertion in narrow gaps left by a closed door in the doorway, and their knurled outer surfaces will positively engage the door and the doorway frame when the jaws are being spread apart.

According to a further feature of the invention the pry assembly is furnished with safety means whereby the pair of prying jaws are prevented from full closure under spring pressure upon retraction of the fluid actuated cylinder. The safety means include a safety strut pivotally mounted to one of the prying jaws and spring biased into abutment against the other jaw when the jaws are being closed from their fully open positions. The jaws are therefore only half closed, instead of being fully closed into contact with each other, upon retraction of the cylinder, precluding the danger of inflicting injury upon the operator during jaw closure.

The above and other objects, features and advantages of this invention and the manner of realizing them will become more apparent, and the invention itself will best be understood, from a study of the following description and appended claims, with reference had to the attached drawings showing some preferred embodiments of the invention.

BRIEF DESCRIPTION OF THE DRAWINGS

FIG. 7 is a side elevational view explanatory of the angular position of a safety strut, included in the FIG. 5 pry assembly, when the pair of prying jaws are open;

FIG. 8 is a view similar to FIG. 7 explanatory of how the safety strut arrests the closure of the prying jaws, in order to hold them only half closed;

DESCRIPTION OF THE PREFERRED EMBODIMENTS

Figure 1:
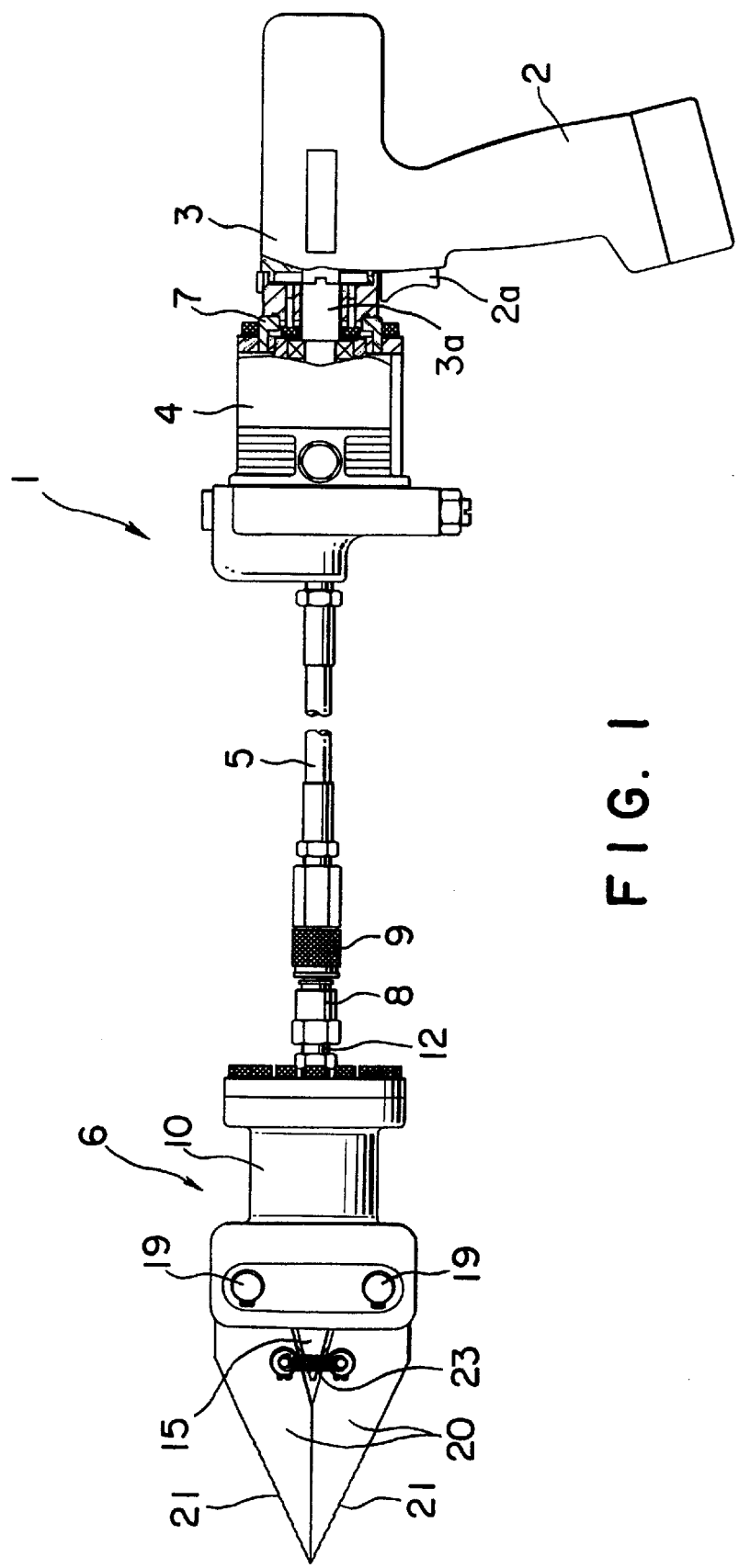
FIG. 1 is a side elevation, partly shown in section and partly broken away for illustrative convenience, of a hydraulic prying machine embodying the novel concepts of this invention, the machine employing a pry assembly as a tool.

The invention will now be described in detail as embodied in what might be described as a power pry illustrated in FIG. 1. Generally designated 1, the representative machine broadly comprises an electric drive motor 3 complete with a hand grip 2, a hydraulic pump 4 coupled directly to the motor 3 thereby to be driven for pressurizing a hydraulic fluid such as oil, a flexible conduit 5 having one extremity coupled to the pump for conveying the pressurized fluid, and a pry assembly 6 removably coupled to another extremity of the flexible conduit for performing a prying operation by being powered by the pressurized fluid from the pump.

The hand grip 2 of the motor and pump assembly has a trigger switch 2a to be finger actuated for setting the drive motor 3 in rotation. The drive motor 3 has its armature shaft 3a extending into the pump 4 to enable the same to conventionally pressurize the fluid contained therein. Both motor 3 and pump 4 can be of any known or suitable design, so that no more detailed description of these components is considered necessary.

However, according to an optional feature of this invention, the motor 3 and the pump 4 are shown coupled together via a swivel joint 7 whereby the pump, together with the conduit 5 and pry assembly 6 coupled thereto, is made rotatable 360 degrees around the motor armature shaft 3a with respect to the motor. The freedom of rotation of the pry assembly 6 relative to the motor 3 is intended to enhance the ease of handling of the prying machine 1.

The conduit 5 should be sufficiently pressure proof, flexible, and heat and impact resistant for use of the machine as a power pry under the most adverse circumstances that must be anticipated at sites of emergency. The conduit 5 terminates at one end in a female coupling unit 9 which is removably connected to a male coupling unit 8 on the pry assembly 6.

Figure 2:
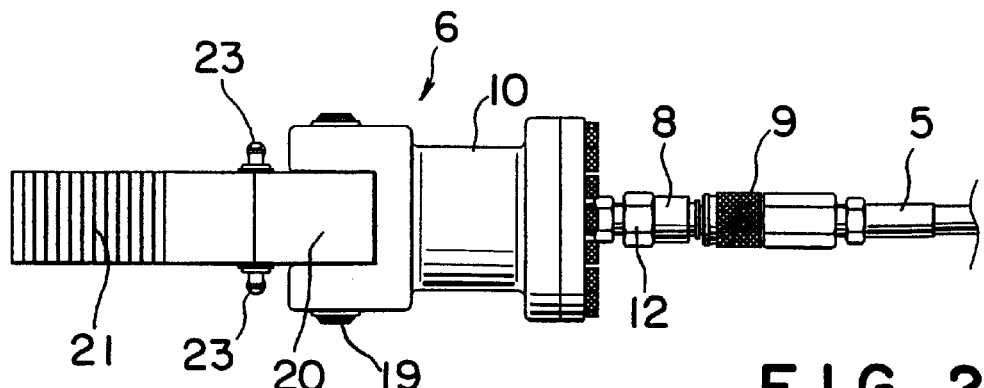
FIG. 2 is a top plan of the pry assembly of the FIG. 1 machine.
Figure 3:
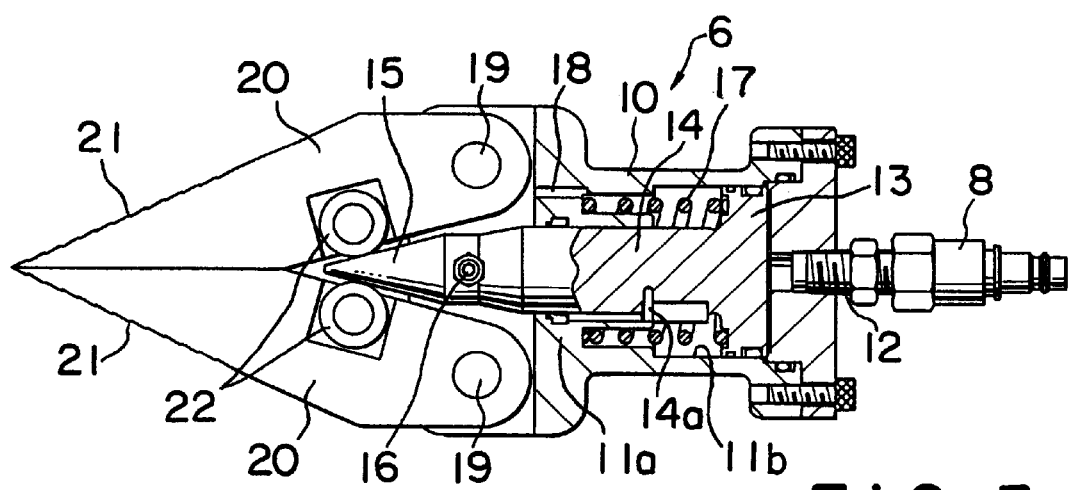
FIG. 3 is an enlarged side elevation, partly sectioned for clarity, of the FIG. 2 pry assembly, the view showing the pair of prying jaws closed.
Figure 4:
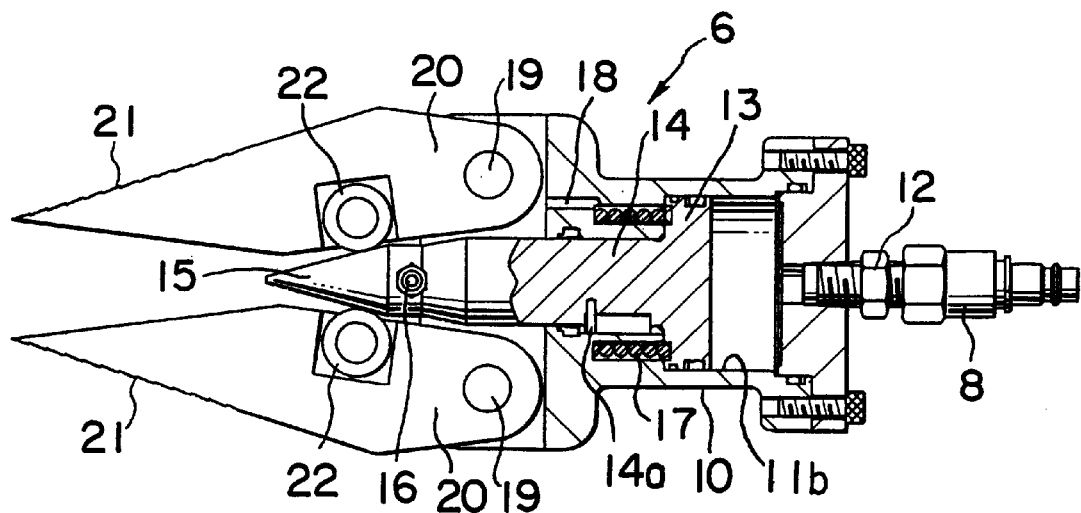
FIG. 4 is a view similar to FIG. 3 except that the pair of prying jaws are shown open.

As shown also in FIGS. 2–4, the pry assembly 6 includes a hollow body 10 having a piston 13 reciprocably and pressure tightly mounted therein. The piston 13 defines within the body 10 a fluid chamber 11a in constant communication with the pump 4 via the flexible conduit 5, and a spring chamber 11b accommodating a coiled return spring 17. The fluid chamber 11a is open to the flexible conduit 5 via a fixture 12 and the noted male coupling unit 8. The piston 13 has a piston rod 14 extending therefrom and projecting outwardly of an end wall 11a of the body 10. The piston rod 14 carries a key 14a which is slidably received in a keyway in the cylinder end wall 11a in order to prevent angular displacement of the piston 13 relative to the body 10. An air vent is formed at 18 in the body end wall 11a for communicating the spring chamber 11b with the atmosphere.

Thus, upon introduction of the pressurized fluid from the pump 4 into the fluid chamber 11a, the piston 13 will travel on its power stroke from its FIG. 3 position to that of FIG. 4 against the force of the return spring 17. When the pump 4 is set out of operation, on the other hand, the piston 13 will travel back to the FIG. 3 position under the force of the return spring 17. A hydraulic cylinder of the familiar single acting, spring return variety is thus provided.

Fastened at 16 to the projecting end of the piston rod 14, a wedge 15 is disposed between a pair of prying jaws 20 for operating the same. The prying jaws 20 are both pivoted each at or adjacent one end 23 to the body 10 for movement between the closed positions of FIG. 3, in which the jaws are held against each other, and the open positions of FIG. 4 in which the jaws are spread apart from each other. A pair of return springs 23, FIGS. 1 and 2, conjointly biases the jaws 20 from their open to closed positions. Normally allowing the prying jaws to be held closed under the spring pressure, the wedge 15 spreads them apart when thrust forwardly.

The free ends of the prying jaws 20 taper forwardly for ease of insertion in narrow gaps. FIG. 2 best indicates that the outer surfaces 21 of the prying jaws 20 are both knurled. These knurlings are intended to assure firm engagement of the prying jaws with, for instance, a door and a doorway frame in forcing open the door.

As revealed by both FIGS. 3 and 4, the prying jaws 20 have a pair of rolls 22 rotatably mounted thereto for rolling engagement with the wedge 15 as the latter travels back and forth between the two positions of FIGS. 3 and 4. The rolls 22 are intended to minimize the frictional loss of power in spreading apart the prying jaws 20 by the wedge 15.

Operation

One operator may hold the pry assembly 6 and insert the tips of the prying jaws 20 in, for instance, a gap left in a doorway by a closed door. Holding the hand grip 2 of the motor and pump assembly, another operator may pull the trigger switch 2a to set the motor 3 into rotation. Driven by the motor armature shaft 3a, the pump 4 will pressurize the fluid for delivery to the pry assembly 6 by way of the flexible conduit 5.

It is understood that the piston rod 14 of the pry assembly 6 is now retracted into the hollow body 10 under the force of the return spring 17 as in FIG. 3, permitting the pair of prying jaws 20 to be closed under the bias of the springs 23. Then, upon introduction of the pressurized fluid into the fluid chamber 11a from the conduit 5, the piston 13 will travel forwardly with the piston rod 14 against the force of the return spring 17. The wedge 15 on the piston rod 14 will thus be thrust forwardly from its FIG. 3 position to that of FIG. 4 thereby spreading apart the prying jaws 20 in opposition to the forces of the springs 23. The door will then be pried open.

Then the drive motor 3 may be set out of rotation. The piston 13 will be sprung back to the FIG. 3 position upon cessation of the delivery of the pressurized fluid from the pump 4, causing the fluid to flow back into the pump. With the consequent retraction of the piston rod 14 together with the wedge 15, the prying jaws 20 will close under the bias of the springs 23.

It is to be appreciated that only the pry assembly 6 must be brought to the location of the door to be pried. The motor and pump assembly may be positioned at any convenient distance away that is permitted by the conduit 5.

In practice, moreover, the gap into which the jaws 20 are to be inserted may extend either vertically, horizontally, or at any angle in between. The pry assembly 6 must then be correspondingly varied in its angular orientation around the piston axis. No matter how one operator varies the angular orientation of the pry assembly 6, the other operator need not change that of the hand grip 2 which he holds, since the drive motor 3 is coupled to the pump 4 via the swivel joint 7.

As an additional advantage, the pry assembly 6 is readily detachable from the conduit 5. The pry assembly may therefore be replaced as necessary by another similar assembly that permits the pair of prying jaws to be spread apart to a different angle, by a different tool assembly for an operation other than prying.

Second Form

Figure 5:
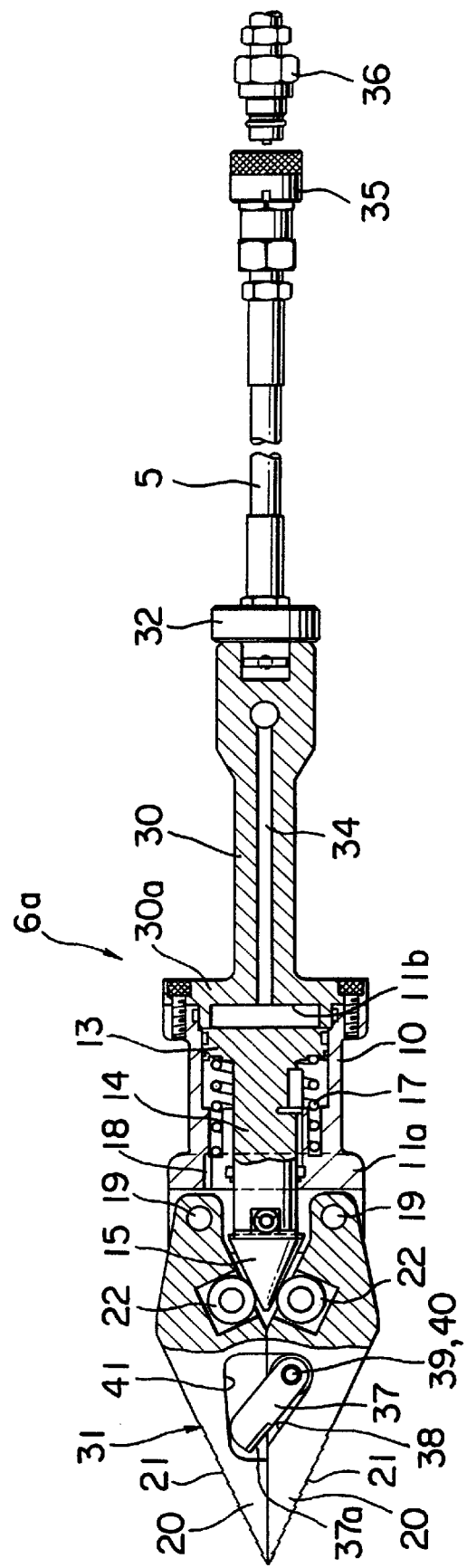
FIG. 5 is a section, partly shown in elevation for illustrative convenience, through another preferred form of pry assembly according to the invention.
Figure 6:
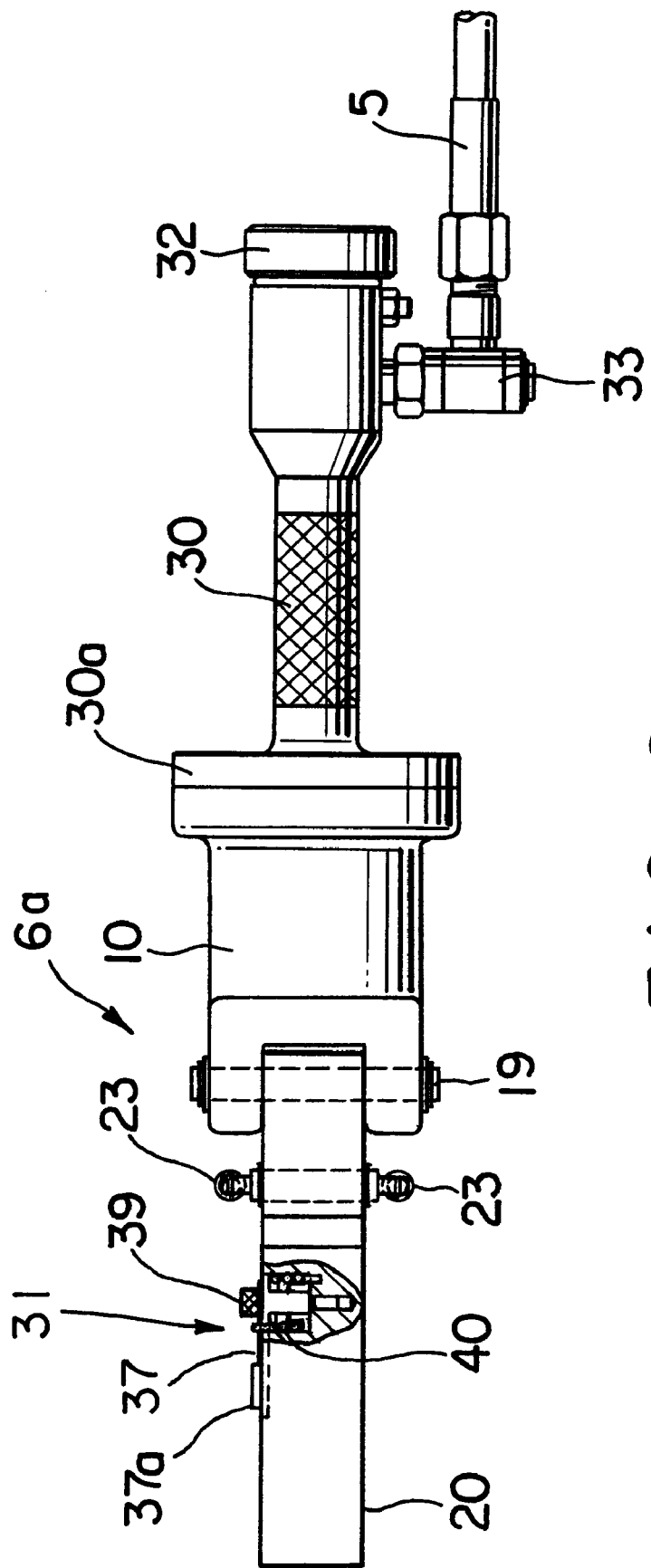
FIG. 6 is a top plan of the FIG. 5 pry assembly.

FIGS. 5 and 6 show a modified pry assembly 6a for use with the motor and pump assembly of FIG. 1 in place of the first disclosed pry assembly 6. The modified pry assembly 6a features a hand grip 30 and safety means 31, both designed to enhance the practical utility of the machine.

The hand grip 30, preferably knurled as depicted in FIG. 6, has a flange 30a on one end which is fastened to the body 10. Extending collinearly with the body 10, the hand grip 30 has an abutment 32 rotatably mounted to the other end thereof, in order that the pry assembly may be pushed into a doorway gap or the like with this abutment held against the abdomen of the operator.

Since the flexible conduit 5 cannot possibly be coupled coaxially to the body 10 as in the preceding embodiment, or to the hand grip 30 because of the provision of the rotary abutment 32, the conduit is offset from the hand grip and coupled thereto via a swivel joint 33. The hand grip 30 has a fluid passageway 34 extending longitudinally therethrough for directing the fluid into and away from the fluid chamber 11a in the body 10. Also, in this alternate embodiment, the conduit 5 is detachably coupled to the pump 4, FIG. 1, via a female coupling unit 35, FIG. 5, on the conduit and a male coupling unit 36 on the pump.

As better pictured in FIGS. 7 and 8, the safety means include a safety strut 37, complete with a thumbpiece 37a, which is pinned at 39 to one of the gripping jaws 20 for pivotal displacement through an angle determined by a recess 38 in that one jaw. The safety strut 37 is thus pivotable between a retracted position of FIG. 5, in which the strut permits the gripping jaws to be fully closed, and a working position of FIG. 8 in which the strut holds the jaws half closed. A torsion spring 40, FIG. 6, is sleeved upon the pivot pin 39 for biasing the safety strut 37 from the retracted toward the working position. The other gripping jaw 20 is also recessed at 41 so as not to interfere with the pivotal motion of the safety strut 37 between the two positions.

The modified pry assembly 6a is analogous in the other details of construction with the pry assembly 6. Also, the pry assembly 6a lends itself to use with the motor and pump assembly of the same construction as that shown in FIG. 1.

Operation of Second Form

The safety strut 37 will be sprung to the working position, as shown in FIG. 7, when the pair of griping jaws 20 are opened by the wedge 15 as in this figure. Then, upon retraction of the wedge 15, the strut 37 will arrest the resulting closure of the gripping jaws in positions intermediate the fully open and the fully closed positions, leaving a spacing G between the jaws as in FIG. 8. The operator is thus safeguarded against the risk of having its fingers caught between the jaws. The full closure of the jaws is of course possible by retracting the safety strut 37 to the FIG. 5 position through manipulation of the thumbpiece 37a.

The modified pry assembly 6a offers the additional advantage of greater operability, permitting the operator to firmly grasp the assembly by the hand grip 30. The operability of the pry assembly is further enhanced as the operator can thrust the gripping jaws 20 into a gap by pushing the assembly with his whole body, with the rotary abutment 32 held against his abdomen. Such bodily thrust is also effective to prevent the prying jaws from coming out the gap during prying. Furthermore, if the gap is too narrow to insert the prying jaws with bodily force, the abutment 32 may be struck with a hammer, or a handy stone, to drive in the jaws.

Third Form

Figure 9:
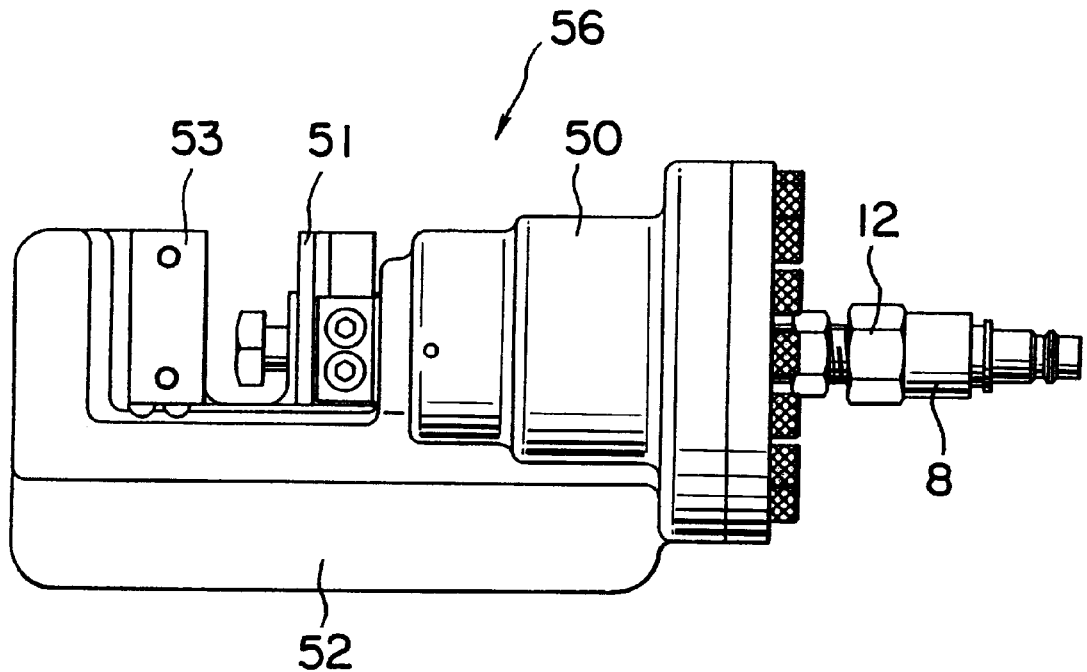
FIG. 9 is a side elevation of a shear assembly for use with the FIG. 1 machine in substitution for the pry assembly.
Figure 10:
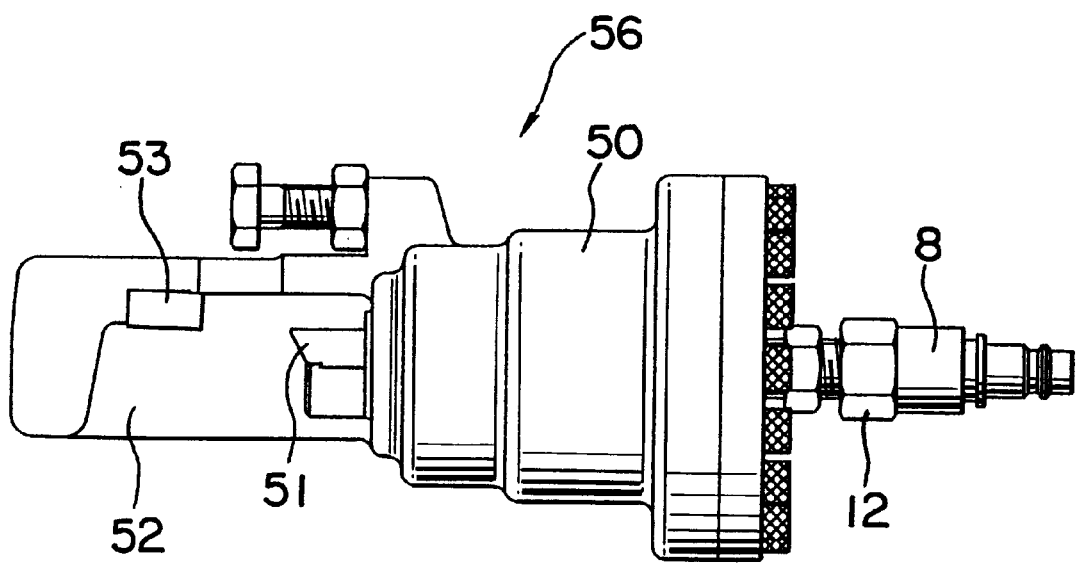
FIG. 10 is a top plan of the FIG. 9 shear assembly.

The machine according to the invention finds use for purposes other than prying. Thus, in FIGS. 9 and 10, there is shown a cutter assembly 56 to be used in combination with the motor and pump assembly of FIG. 1 in substitution for the pry assembly 6. The cutter assembly 56 includes a body 50 forming a part of a hydraulic cylinder similar to that of the FIGS. 1–5 pry assembly 6. Also included are a movable cutting die 51 fastened to the piston rod of the hydraulic cylinder, and a fixed cutting die 53 mounted to a jaw 52 extending from the body 50. Objects such as steel frame members can be cut by shearing action as the movable cutting die 51 is thrust past the fixed cutting die 53.

Fourth Form

Figure 11:
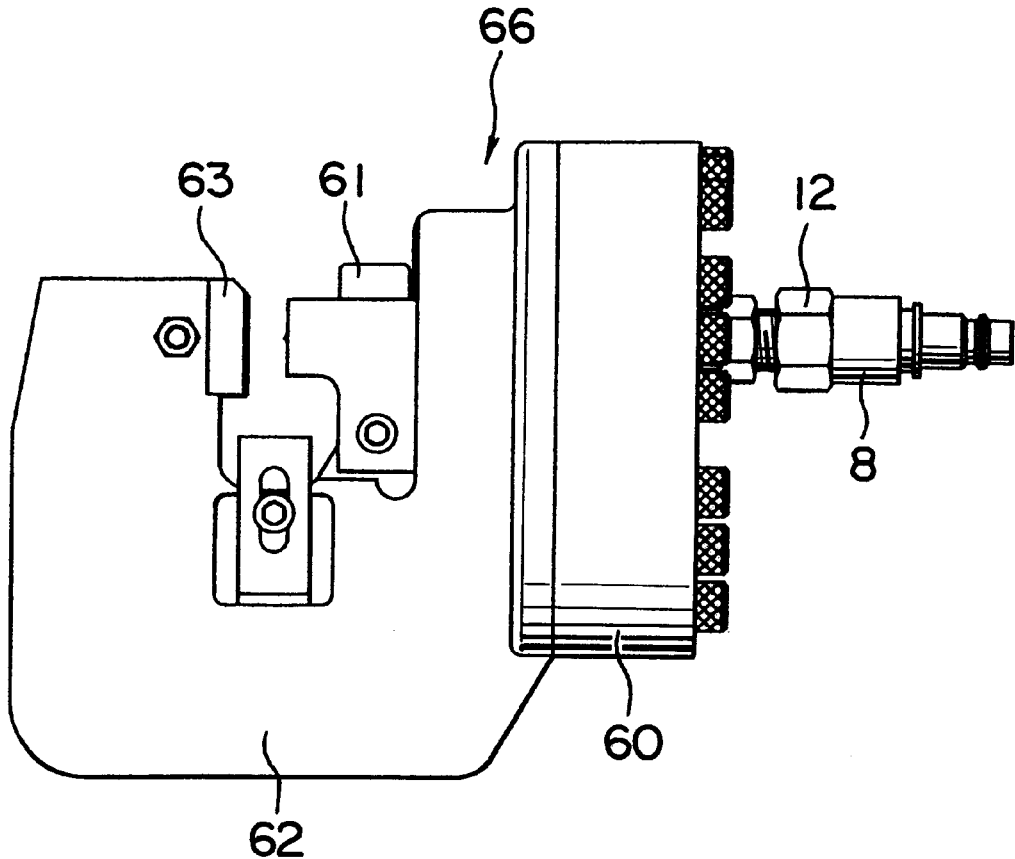
FIG. 11 is a side elevation of a punch assembly for use with the FIG. 1 machine in substitution for the pry assembly.
Figure 12:
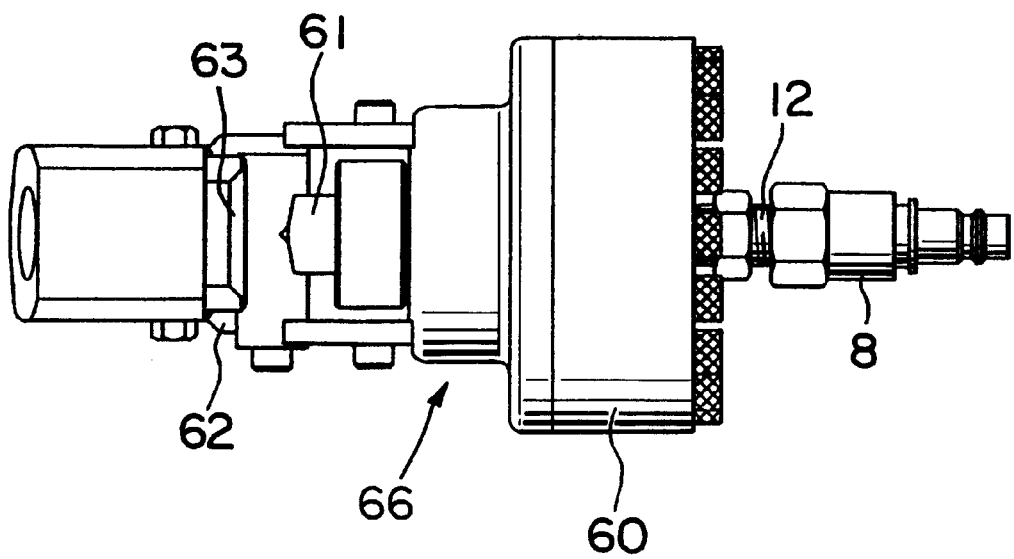
FIG. 12 is a top plan of the FIG. 11 punch assembly.

FIGS. 11 and 12 show a perforating punch assembly 66 for use in combination with the motor and pump assembly of FIG. 1 in substitution for the pry assembly 6. The punch assembly 66 includes a body 60 forming a part of a hydraulic cylinder similar to that of the FIGS. 1–5 pry assembly 6. Also included are a punch 61 affixed to the piston rod of the hydraulic cylinder, and a die 63 mounted to a jaw 62 secured to the body 60. Objects such as steel frame members can be perforated as the punch 61 is thrust into the die 63.

CONCLUSION

Despite the foregoing detailed disclosure, it is not desired that the invention be limited by the exact showing of the drawings or the description thereof. For example, the machine according to the invention may be used for purposes other than those suggested herein, such as bending. Further a variety of modifications or alterations of the illustrated embodiments will suggest themselves to those versed in the art, in order to conform to design preferences or to the requirements of each specific application of the invention, without in any way departing from the spirit or scope of the invention as expressed in the claims attached hereto.

What is claimed is:

1. A fluid operated machine, comprising:

pump means for pressurizing a fluid;

a flexible conduit having one extremity coupled to the pump means for conveying the pressurized fluid therefrom; and a prying assembly replaceably coupled to another extremity of the flexible conduit and actuated by the pressurized fluid from the pump means for performing a desired operation, wherein said prying assembly comprises:

(a) a body having a hollow formed therein;

(b) a piston reciprocally received in the hollow in the body to define a fluid chamber in communication with the pump means by way of the flexible conduit, the piston having a piston rod extending therefrom;

(c) a pair of prying jaws mounted to the body for pivotal motion between closed positions, in which the jaws are held against each other, and open positions in which the jaws are spread apart from each other;

(d) a safety means for holding the pair of prying jaws in positions intermediate the closed and open positions; and (e) a wedge carried by the piston rod for linear reciprocation therewith, the wedge being positioned between the pair of prying jaws for normally holding the same in the closed positions and for pivoting the jaws to the open positions upon delivery of the pressurized fluid from the pump means to the fluid chamber in the body.

2. The fluid operated machine of claim 1 further comprising a pair of rolls rotatably mounted one to each prying jaw for rolling engagement with the wedge.

3. The fluid operated machine of claim 1 wherein the pair of prying jaw are each wedge shaped, having a pair of knurled surfaces facing away from each other.

4. The fluid operated machine of claim 1 wherein the safety means comprises:

(a) a safety strut mounted to one of the pair of prying jaws for pivotal motion between a retracted position for permitting the prying jaws to be fully closed, and a working position for holding the prying jaws in the intermediate positions; and (b) resilient means for biasing the safety strut from the retracted toward the working position.

5. The fluid operated machine of claim 1 wherein the pry assembly further comprises a hand grip secured to the body.

6. The fluid operated machine of claim 5 wherein the hand grip has an abutment rotatably mounted thereto.

7. The fluid operated machine of claim 1, further comprising a cutter assembly.

8. The fluid operated machine of claim 1, further comprising a punch assembly.

* * * * *